(12) United States Patent
Barry

(10) Patent No.: US 9,010,253 B2
(45) Date of Patent: Apr. 21, 2015

(54) UNDER-WAY TRANSFER VEHICLES AND SYSTEM

(71) Applicant: Leonard D. Barry, Detroit, MI (US)

(72) Inventor: Leonard D. Barry, Detroit, MI (US)

( * ) Notice: Subject to any disclaimer, the term of this patent is extended or adjusted under 35 U.S.C. 154(b) by 0 days.

(21) Appl. No.: 13/682,298

(22) Filed: Nov. 20, 2012

(65) Prior Publication Data

US 2013/0098263 A1 Apr. 25, 2013

Related U.S. Application Data

(63) Continuation-in-part of application No. 12/772,438, filed on May 3, 2010, now Pat. No. 8,312,817.

(60) Provisional application No. 61/174,517, filed on May 1, 2009.

(51) Int. Cl.
| | |
|---|---|
| *B61F 13/00* | (2006.01) |
| *B60P 3/34* | (2006.01) |
| *B61D 47/00* | (2006.01) |
| *B61K 1/00* | (2006.01) |

(52) U.S. Cl.
CPC . *B61F 13/00* (2013.01); *B60P 3/34* (2013.01); *B61D 47/005* (2013.01); *B61K 1/00* (2013.01)

(58) Field of Classification Search
CPC ............ B60F 1/046; B60F 1/00; B60F 1/043; B60F 2301/04; B60P 3/07; B61D 3/184; B61D 3/10; B61D 1/02; B61D 1/025; B61D 17/20; B61D 17/22; B61G 5/00; B61G 1/02
USPC .............. 104/18, 20; 105/3, 4.1, 4.2, 4.3, 4.4, 105/72.2, 215.2, 1.4, 8.1, 238.1; 213/75 R
See application file for complete search history.

(56) References Cited

U.S. PATENT DOCUMENTS

| | | | |
|---|---|---|---|
| 3,030,897 A | 4/1962 | Barry | |
| 3,037,462 A | 6/1962 | Barry | |
| 3,794,196 A * | 2/1974 | Terho et al. | 414/458 |
| 3,892,187 A * | 7/1975 | White, Jr. | 105/75 |
| 3,946,676 A * | 3/1976 | Mackaness et al. | 105/169 |
| 4,130,208 A | 12/1978 | Barry | |
| 4,534,297 A * | 8/1985 | Johnson, Sr. | 105/90.2 |
| 7,779,761 B2 | 8/2010 | Barry | |
| 8,312,817 B2 * | 11/2012 | Barry | 105/355 |
| 2006/0260503 A1 * | 11/2006 | Jeunehomme et al. | 105/4.1 |
| 2007/0095243 A1 | 5/2007 | Barry | |

OTHER PUBLICATIONS

Cotey, Amtrack's new strategic plan will help railroad become more efficient, customer focused, execs believe, Progressive Railroading, Aug. 2012.

* cited by examiner

*Primary Examiner* — Mark Le
(74) *Attorney, Agent, or Firm* — Gifford, Krass, Sprinkle, Anderson & Citkowski, P.C.

(57) ABSTRACT

This is a vehicle transfer system to connect a roadway vehicle such as a bus to and from a train either when stopped or moving. It mounts the bus end or ends each on the swivel end of a railway car. The bus end which couples a railway car has wheels that retract to clear from the track. All wheels of the bus are lifted if the bus is supported on a railway car at each end. Automatic couplers are provided to couple to a moving train. If the bus is only supported at the front on a swivel coupling car it can have hi-rail retractable swivel truck wheels lowered to the rails to guide the rear of the bus around sharp tram curves.

9 Claims, 10 Drawing Sheets

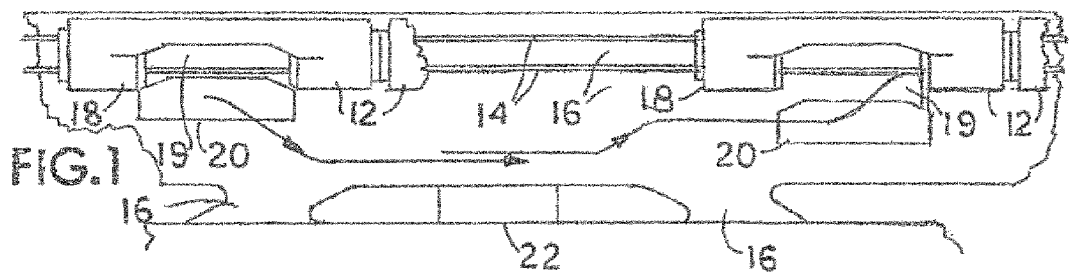
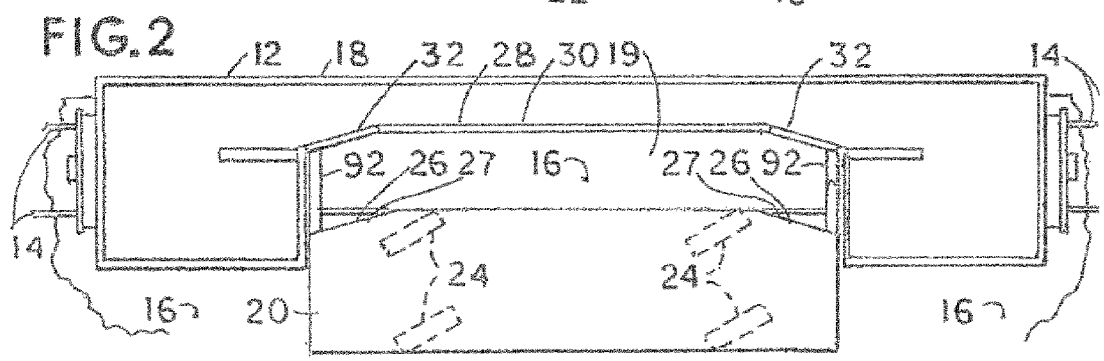
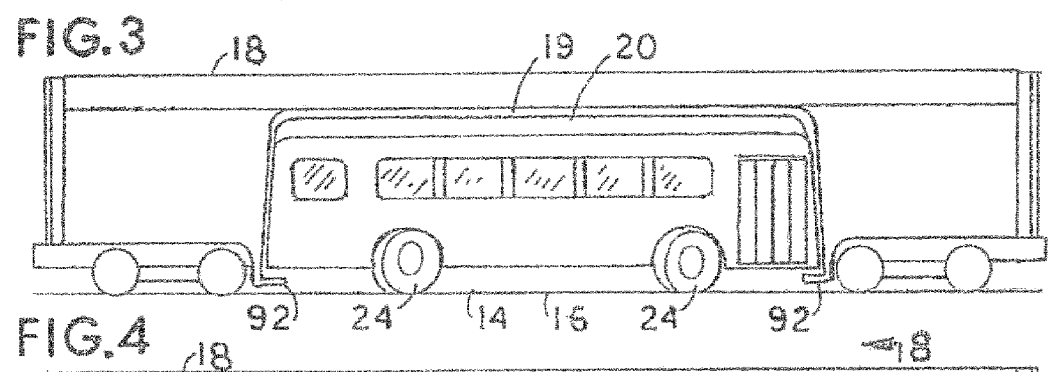
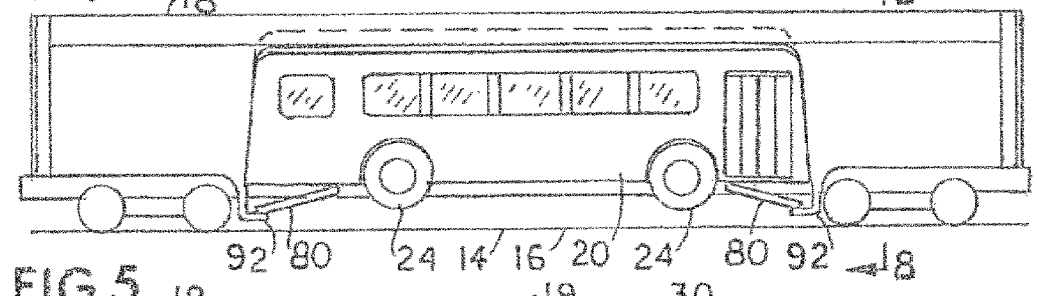
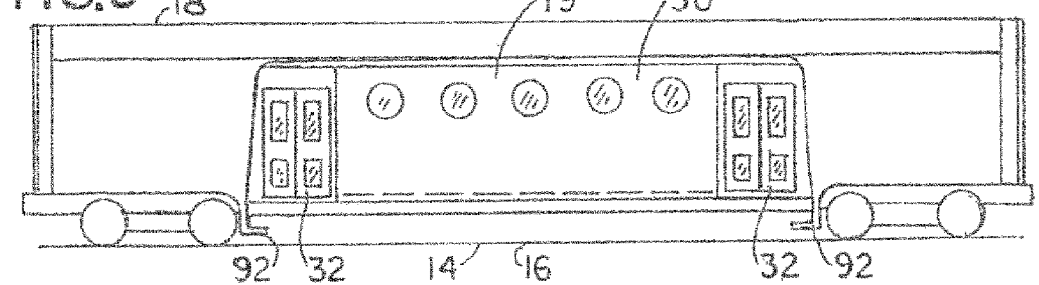

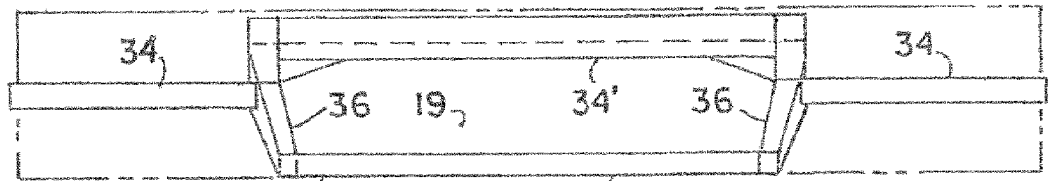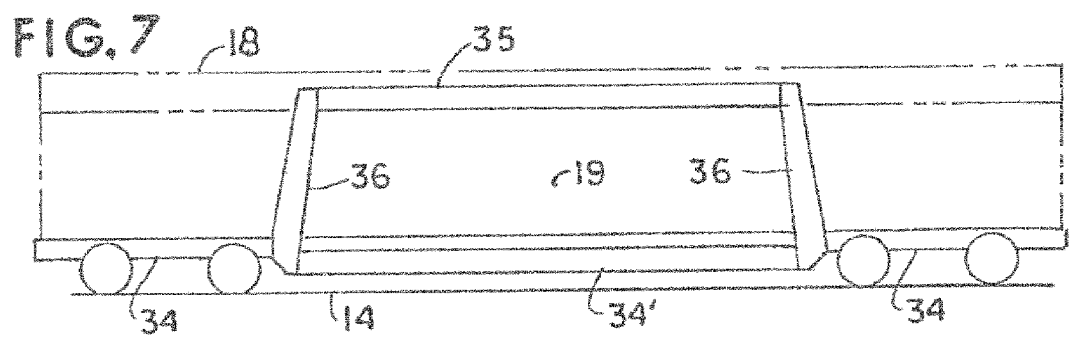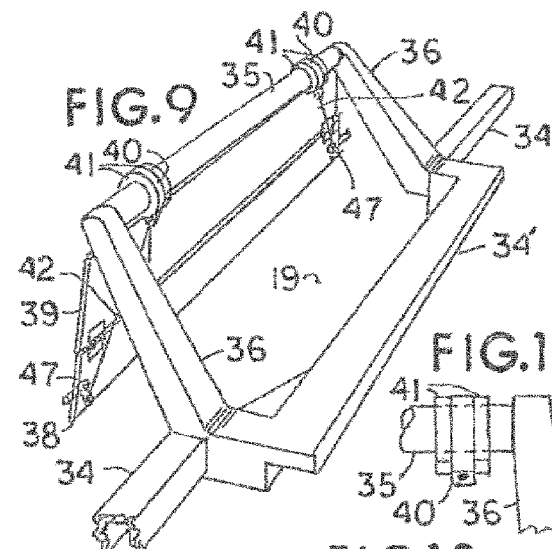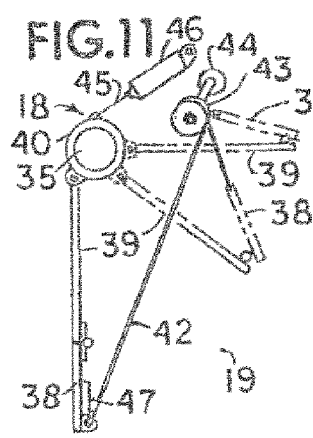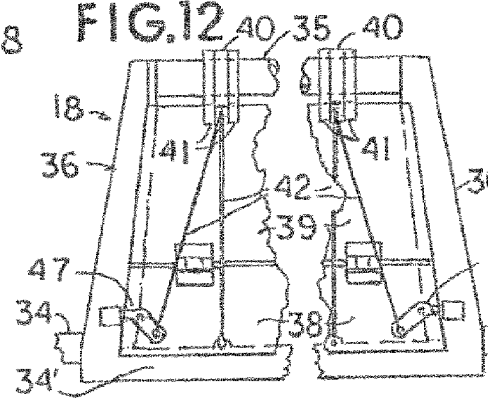

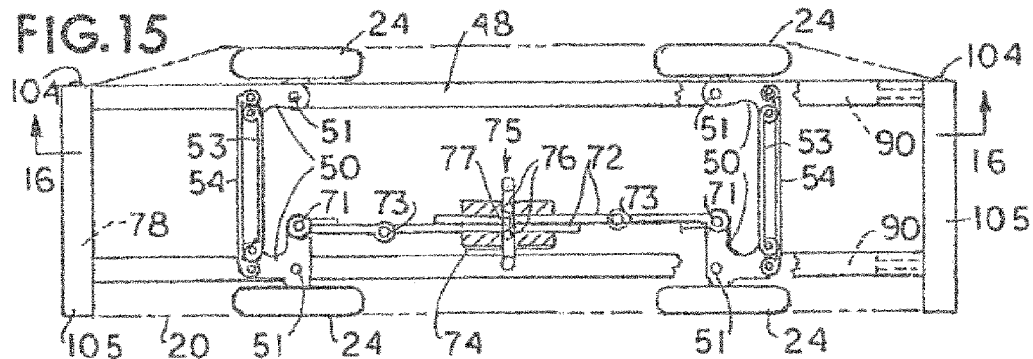
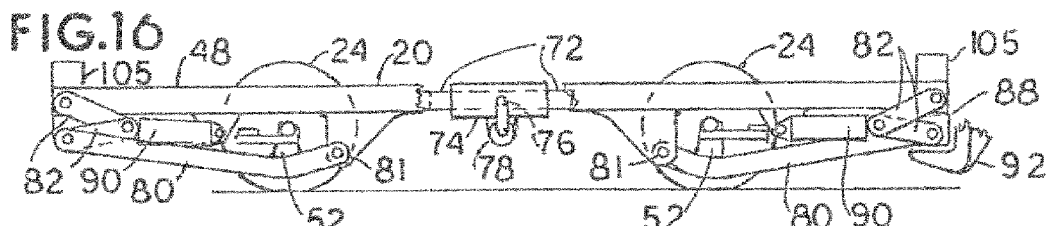
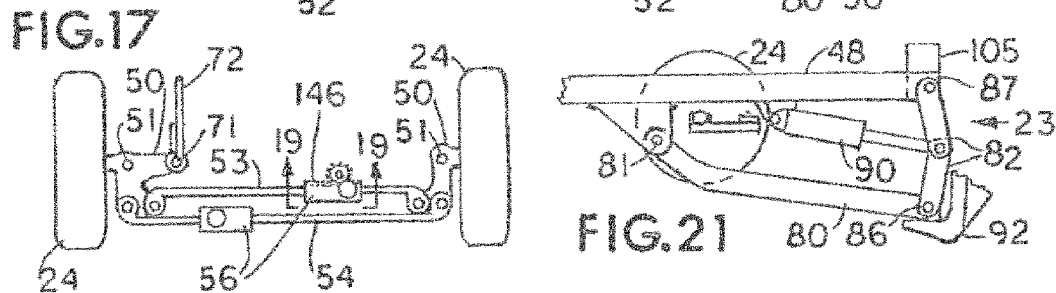
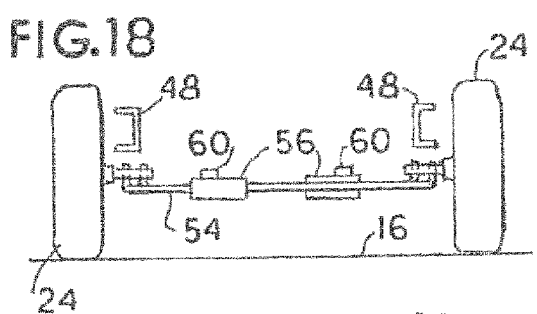
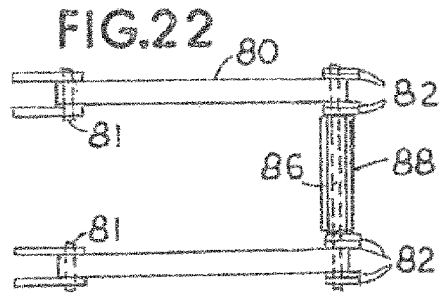
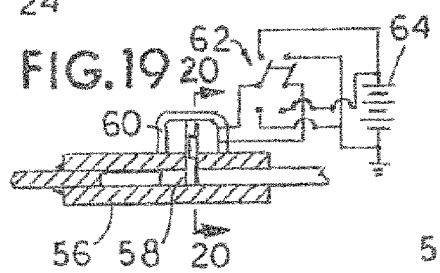
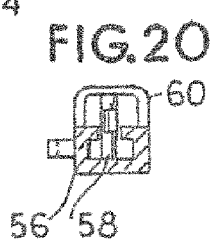
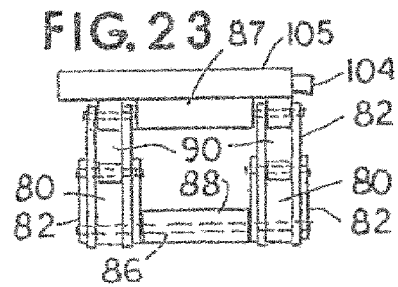

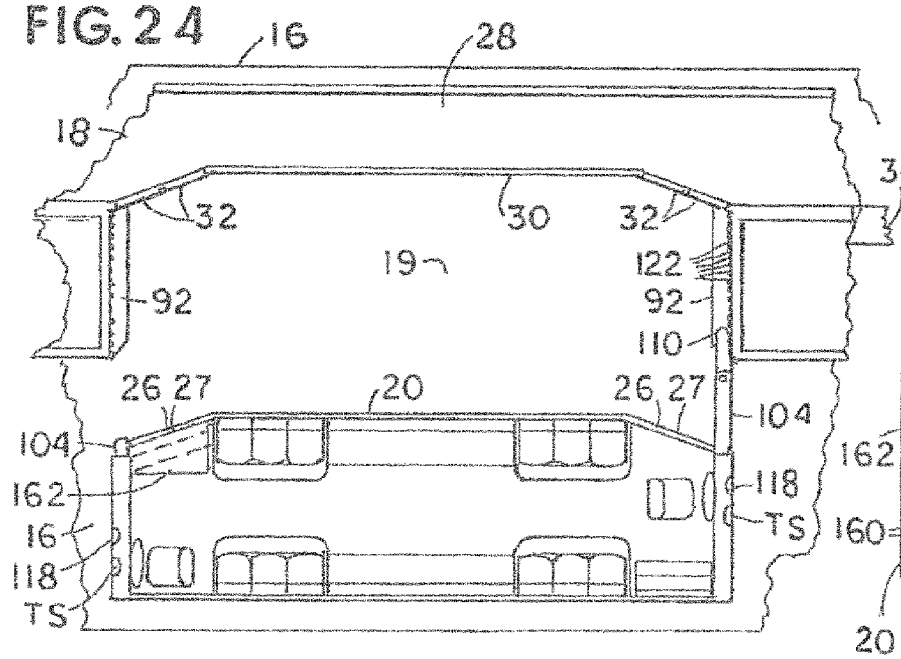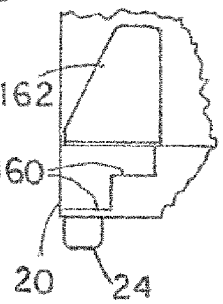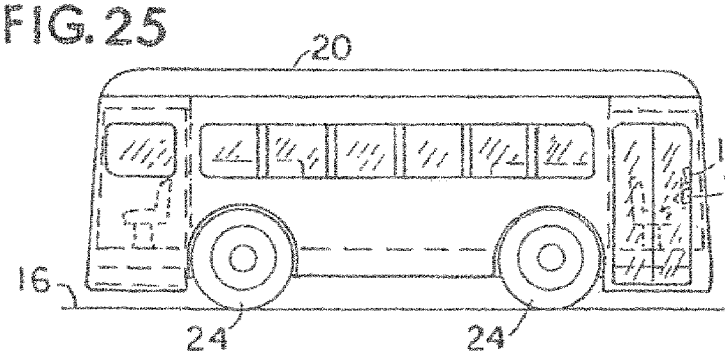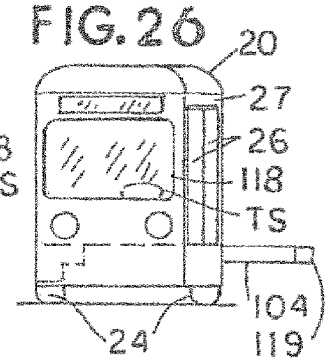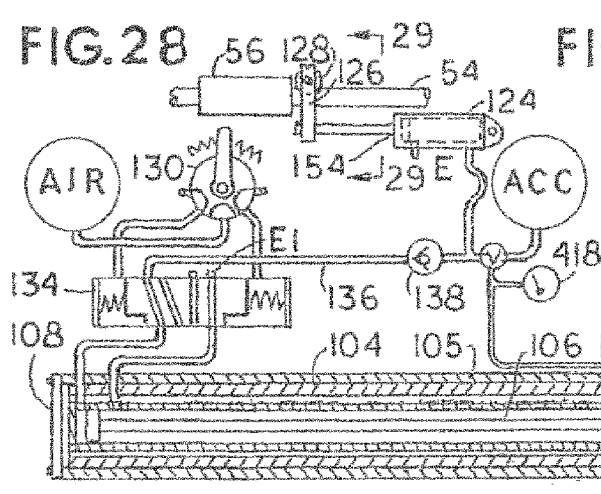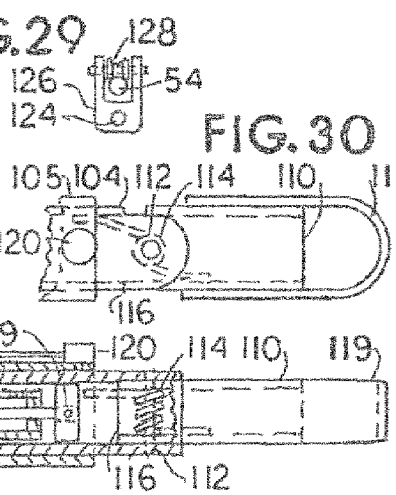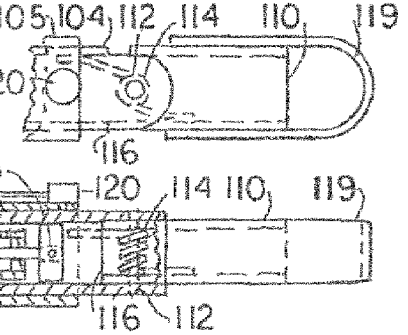

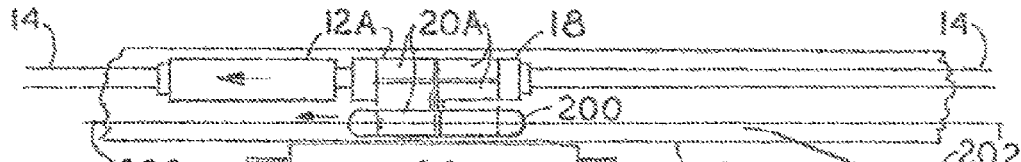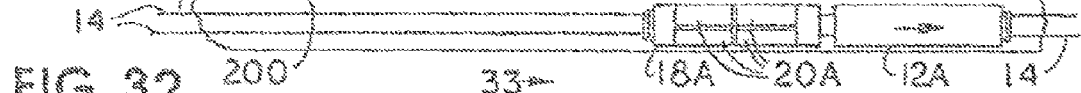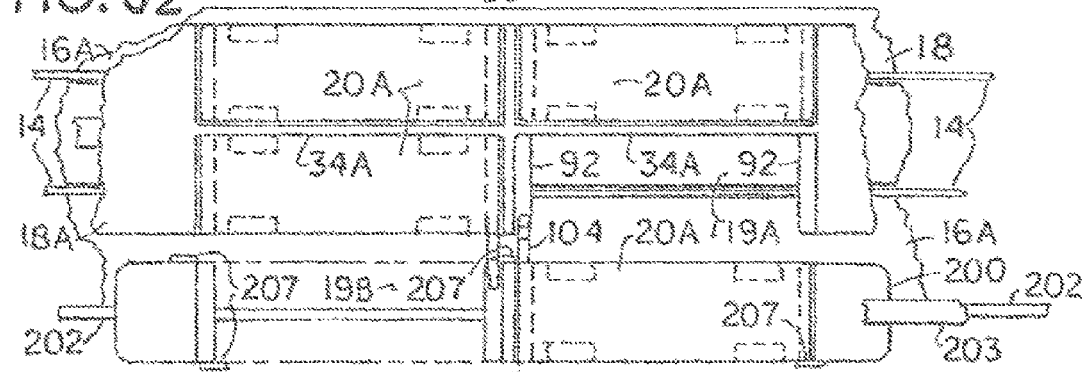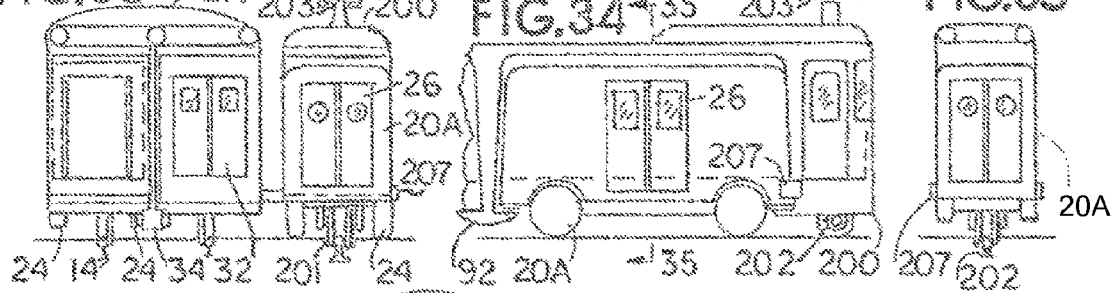

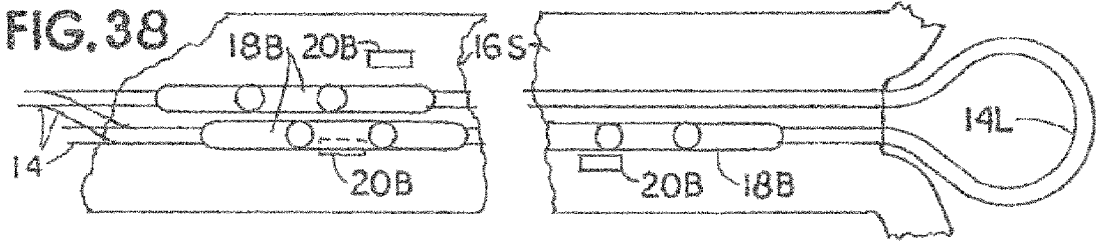
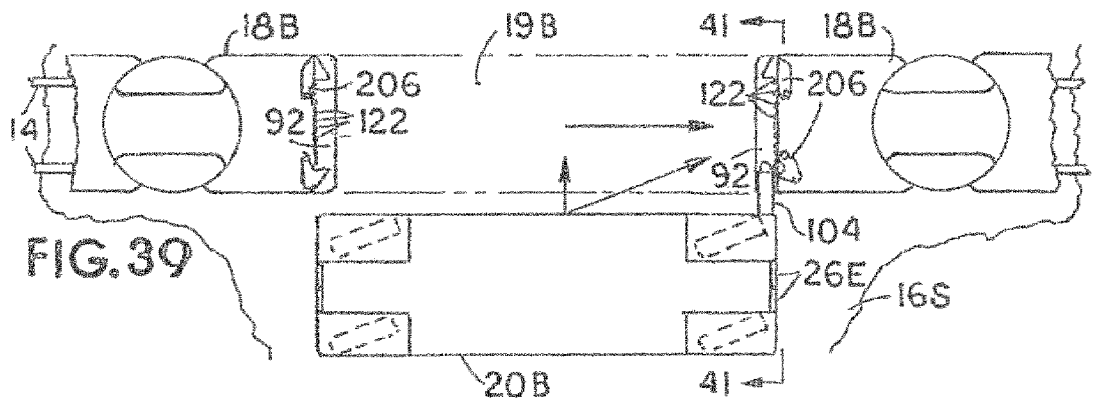
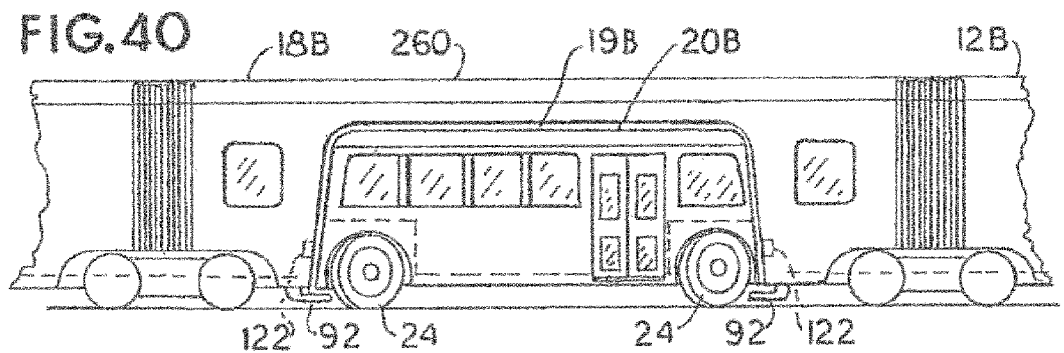
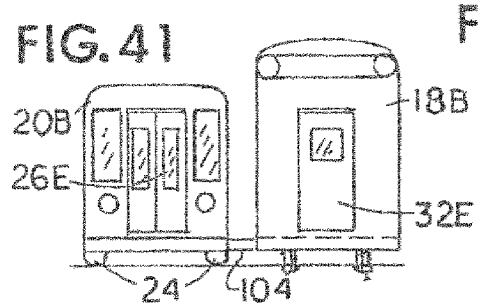
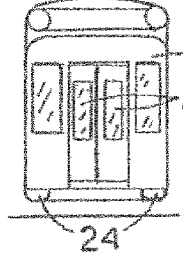
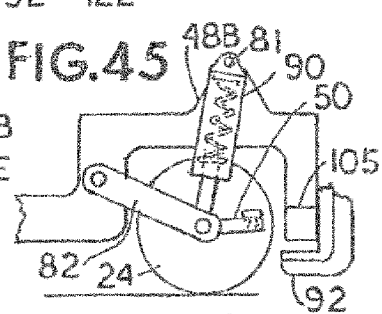
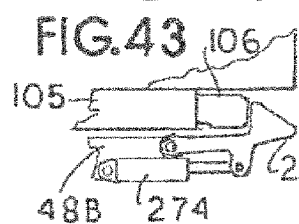
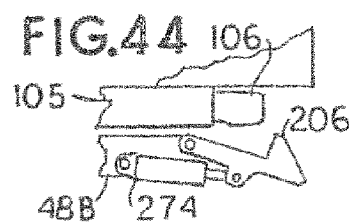
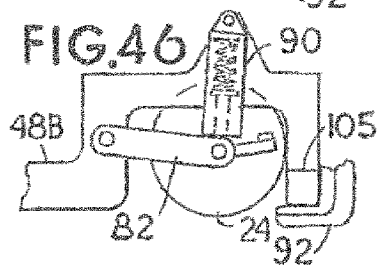

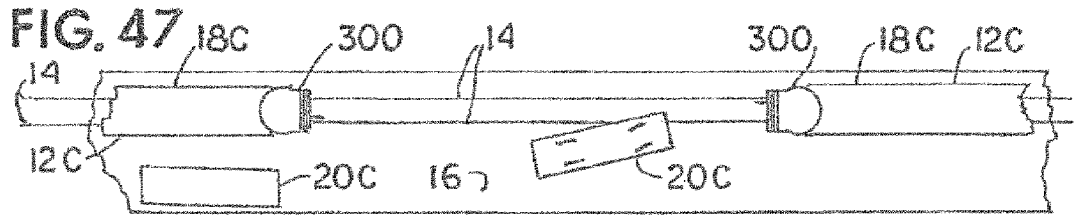
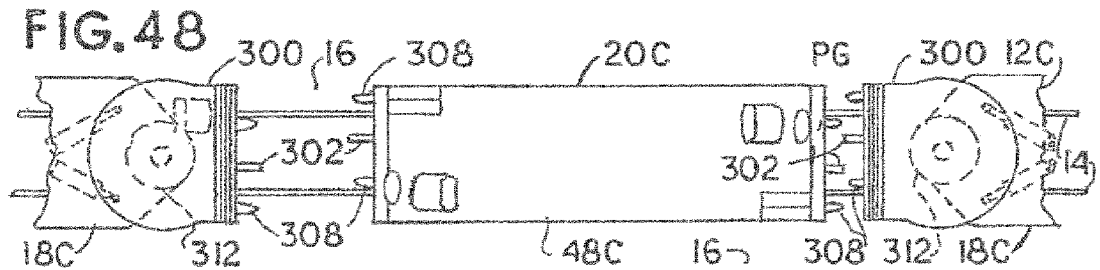
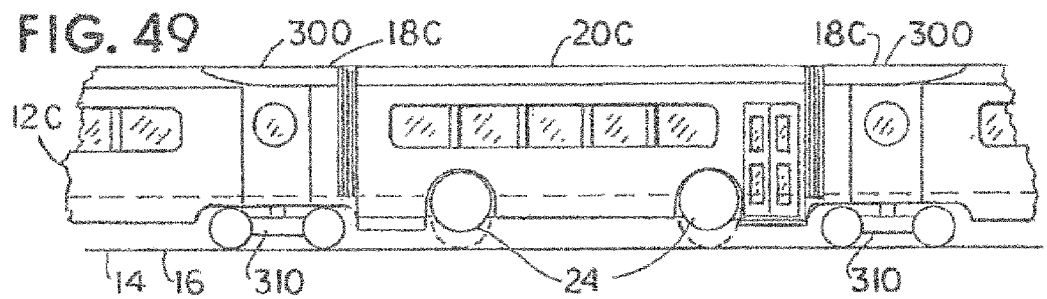
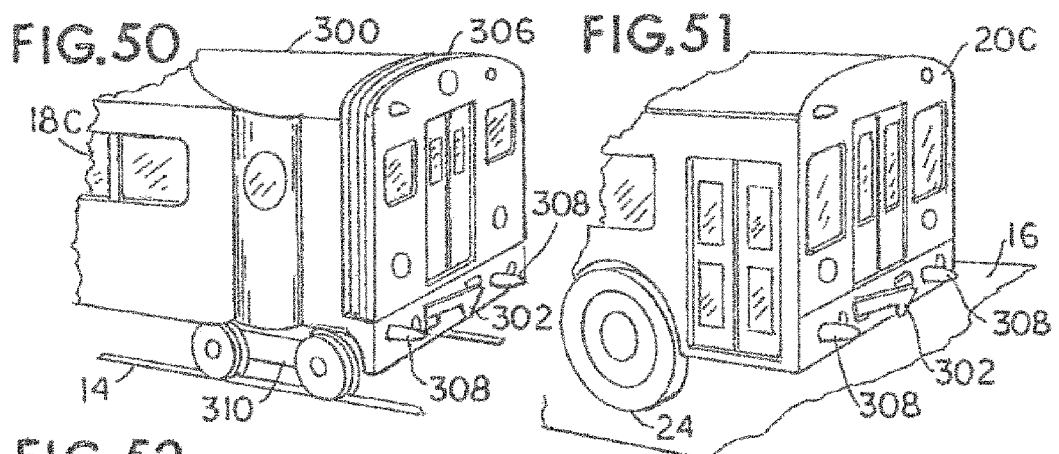
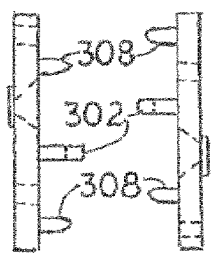
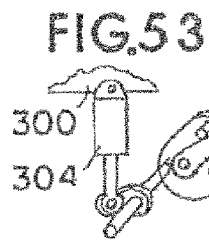
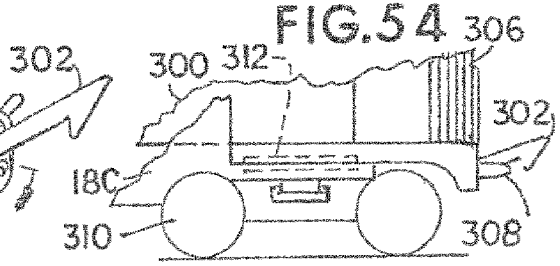

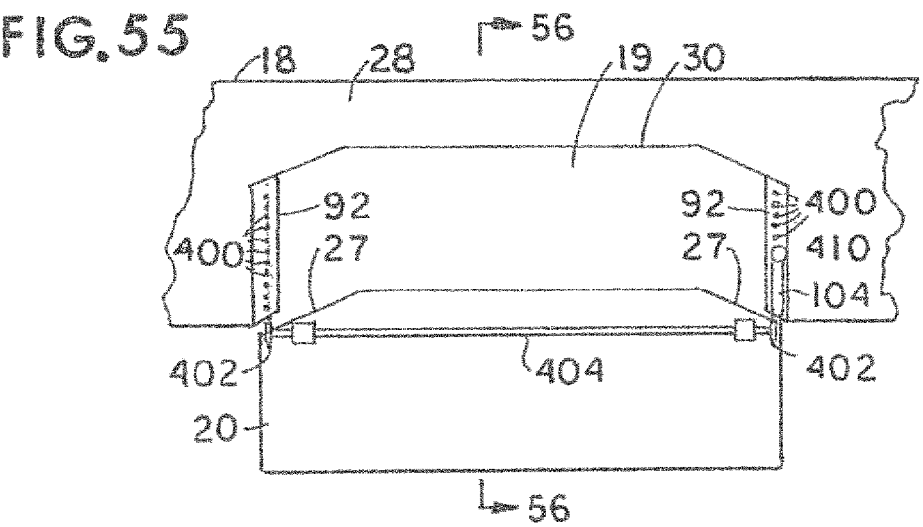
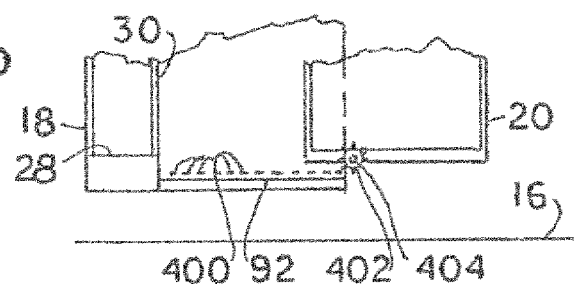
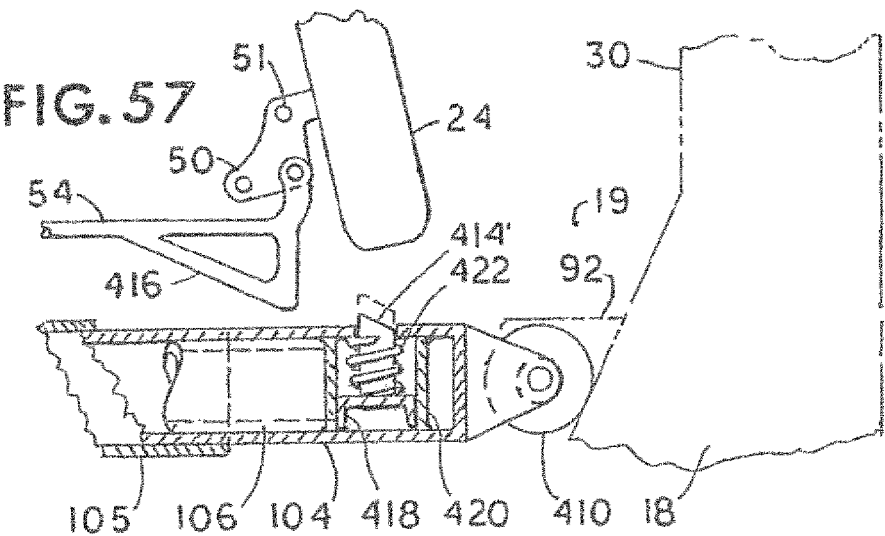

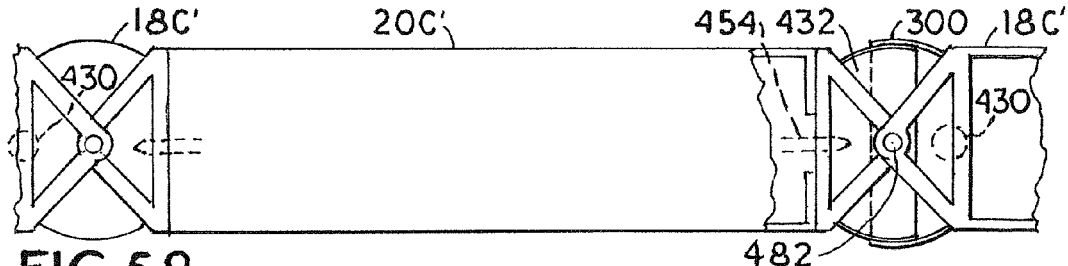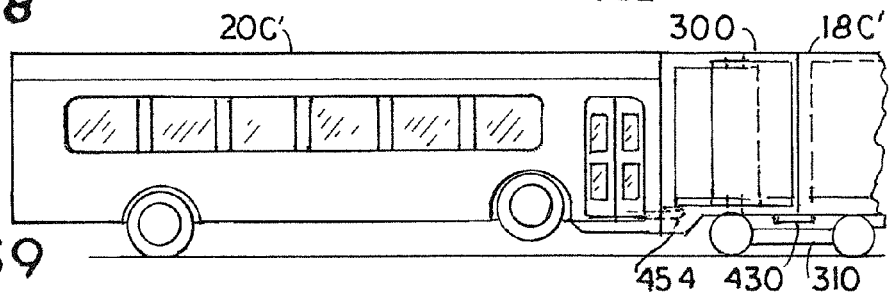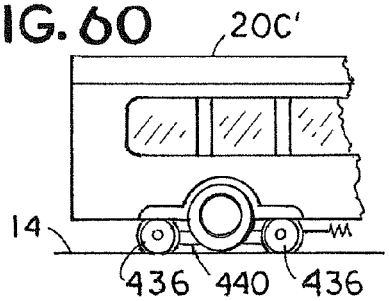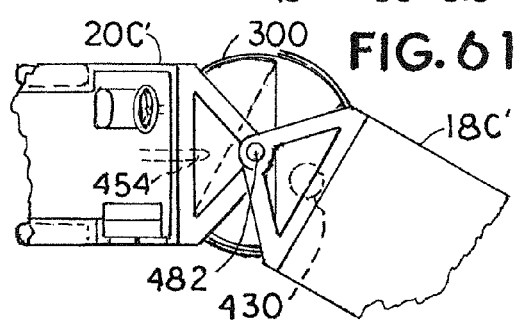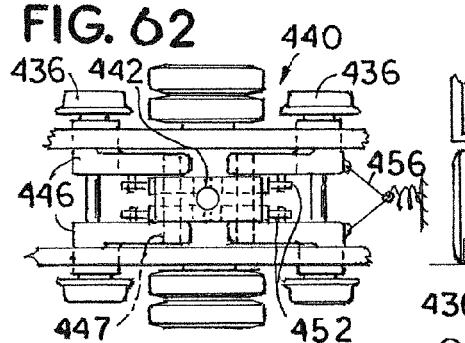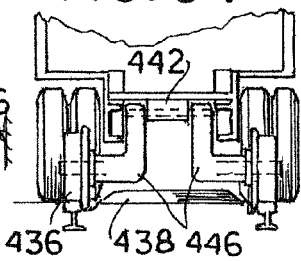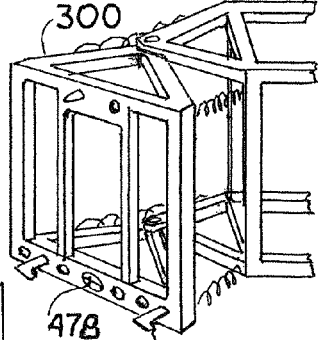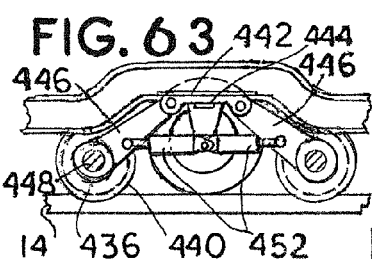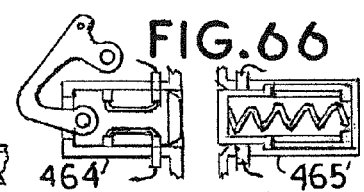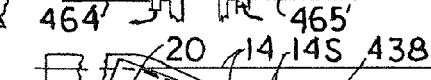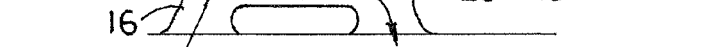

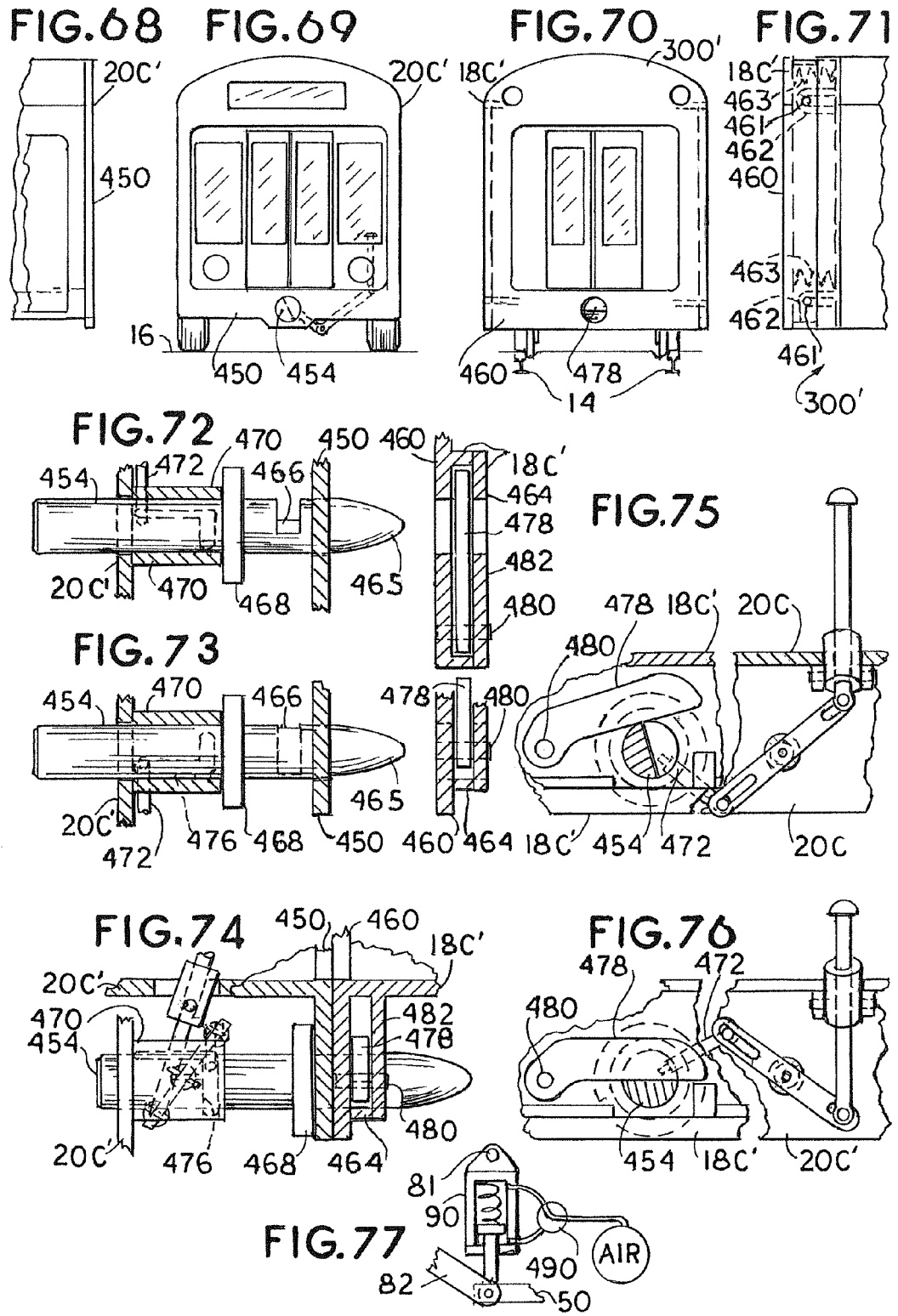

UNDER-WAY TRANSFER VEHICLES AND SYSTEM

CROSS-REFERENCE TO RELATED APPLICATIONS

This application is a continuation-in-part of U.S. Pat. No. 8,312,817 B2 filed May 3, 2010, which is incorporated herein by reference.

SUMMARY OF THE INVENTION

This invention is for transfer of a moving vehicle to and from another moving or standing vehicle.

It is an object to load and unload a passenger train or car using a bus to connect to the rear of the train. The forward end of the bus couples and uncouples the rear swivel end of the car.

It is an object to provide running transfer of a bus, truck, or other motor vehicle to drive into the end of a railway car moving along a track embedded flush in a roadway and seal the opening of the railway car with the bus or enclose the opening with doors when the railway car is run without the bus.

It is an object to simplify selectability of all-wheel parallel steering and Ackerman steering.

It is an object to provide variations for street railways and mass transit.

It is an object that the bus make the stops to pick up and let off people at curbside along a street and put them on and off a tram car train in the middle of the street.

It is an object to have the bus floor and transfer doors at the height of the floor of the rail cars so the bus does not need to be lifted—only its roadway wheels lifted from the runway.

It is therefore an object to provide lifts on the bus for all of its wheels to lift and lower them while traveling on the train to transfer to and from the runway or street.

It is an object to reduce the time to transfer the bus between road and train by substantially eliminating the lifting of the bus on the train.

It is an object to utilize the street as the transfer runway.

It is an object to provide railway cars which can couple and uncouple a bus or roadway vehicle between them and couple together in a train.

It is an object to provide the bus driver with information of train speed to start the bus wheels turning at train speed before setting them down on the runway.

It is an object to provide the bus with end doors for passage to and from the train.

BRIEF DESCRIPTION OF THE DRAWINGS

These other and further objects and features should become evident to those skilled in the art by study of this specification with reference to the drawings wherein:

FIG. 1 is a plan view of a transfer run with train traveling left to right on a railway track flush in a driveway with transfer vehicles (buses) on the driveway entering and leaving the train.

FIG. 2 is a plan view of a railway car with a transfer bus entering its berth (docking) therein, to a larger scale.

FIG. 3 is side elevation of FIG. 2.

FIG. 4 is a side elevation like FIG. 3 after the transfer bus is lifted and secured in the dock car.

FIG. 5 is a side elevation of the empty dock car.

FIGS. 6 and 7 are respectively plan and side views of the sill frame of the dock car.

FIG. 8 is a sectional view on line 8-8 of FIG. 4 to a larger scale.

FIG. 9 is a perspective view of the car sill with berth doors added.

FIG. 10 is detail view of a corner of the upper bypass sill to show a ring for supporting the berth door.

FIG. 11 is an edge elevation of the door and its operating mechanism.

FIG. 12 is an inside view of the door of FIG. 11 on the car sill.

FIGS. 13 and 14 are respectively inside side and bottom views of a door latch at the bottom right of FIG. 12 to a larger scale.

FIG. 15 is a plan view of the roadway vehicle chassis.

FIG. 16 is a section on line 16-16 of FIG. 15.

FIGS. 17 and 18 are respectively plan and end view of the steering controls on the roadway vehicle.

FIGS. 19 and 20 are respectively enlarged sectional views on lines 19-19 of FIGS. 17 and 20-20 of FIG. 19 of a detail of the steering.

FIG. 21 is a side sectional view of the roadway vehicle chassis at the left end of FIG. 16 when lifted on the vehicle.

FIG. 22 is a plan view of a vehicle lift frame for the road vehicle.

FIG. 23 is an end view of FIG. 21 in direction of arrow 23.

FIG. 24 is a plan view of the bus aligned with the depot car.

FIGS. 25 and 26 are respectively side and right end views of the bus.

FIG. 27 is a sectional elevation of steps and cover at one end on the bus.

FIG. 28 is a front cutaway view of an alignment arm for the roadway vehicle with schematic of controls.

FIG. 29 is a section on line 29-29 of FIG. 28.

FIG. 30 is a plan view of right end of FIG. 28.

FIG. 31 is a station plan adapting this transfer system to mass transit.

FIG. 32 is a plan view of a transit depot car and station stopping car aligned for transfer of a transfer container.

FIG. 33 is a left end elevation of FIG. 32.

FIG. 34 is a partial side view of the station car with a transfer car.

FIG. 35 is a section on line 35-35 of FIG. 34.

FIG. 36 is a perspective of the end of the depot car of FIGS. 31-34 with a transfer vehicle aligned for transfer alongside an empty berth abreast to a berth with a transfer vehicle being used as the aisle past the empty berth.

FIG. 37 is a plan view of a transfer vehicle aligning to enter a transfer berth on this car.

FIG. 38 is a street plan of this transfer system applied to a street railway where buses transfer passengers between trains and curbside.

FIGS. 39-42 are respectively plan, side, and two end views of a low floor tram depot car in a tram train of FIG. 38 with a transfer bus aligned for transfer.

FIGS. 41 and 42 are before and after the bus enters the train.

FIGS. 43 and 44 are end plan views of latches of the depot car for securing the transfer vehicle shown in respectively closed and open positions.

FIGS. 45 and 46 are respectively side elevations of a wheel lift for the transfer vehicle before and after lifting on the depot car.

FIG. 47 is a plan view of a runway with train uncoupled between two station cars now separated for a bus between them to leave and another bus to entrain.

FIG. 48 is a plan view of the bus entering between cars to be coupled into the train.

FIG. 49 is a side view of FIG. 48 after the bus is in the train with its wheels lifted.

FIGS. 50 and 51 are perspective end views of a rail car and a bus for coupling.

FIG. 52 is a plan view of end couplers aligned to meet and couple.

FIG. 53 is a perspective of a latch coupler and its lift mechanism.

FIG. 54 is a side cutaway of a swivel car end supported on the end of the railway car supported on a railway truck.

FIG. 55 is a plan schematic of a bus or container entering a berth on a train car with rack and pinion parallel alignment control added to prevent hang-ups caused by twisting forces to prevent it wedging crooked while moving in and out of the berth.

FIG. 56 is a sectional elevation taken on line 56-56 of FIG. 55.

FIG. 57 is a sectional plan of the outer end of an alignment arm with steering latch and catch engaging a railway depot car as shown in phantom.

FIG. 58 is a plan view of the highway vehicle between swivel end cars in a train.

FIG. 59 is a side view of the highway vehicle, shown as a bus, attached to and supported front end on the rear of the train with the front wheels of the bus lifted off of the pavement.

FIG. 60 is a side view of the rear of the bus with a hi-rail swivel truck lowered for guiding the bus end on the railway track.

FIG. 61 is a plan view of the swivel railway car end with front of the bus mounted thereon.

FIGS. 62 and 63 are respectively plan and sectional side views of the hi-rail swivel truck mounted on the rear of the road vehicle to larger scale.

FIG. 64 is an end view of the hi-rail swivel truck.

FIG. 65 is a perspective view of the swivel coupling and car end framing.

FIG. 66 is a lengthwise sectional view of the electrical and air line coupling between the bus and railway car.

FIG. 67 is a station plan.

FIGS. 68 and 69 are respectively side and end elevations of the front face of the motor vehicle.

FIGS. 70 and 71 are respectively end and side elevation views of the rear frame of the railway car.

FIGS. 72 and 73 are respectively plan and side views of a vehicle coupler (open) in retracted position about to engage in a railway car coupling latch shown larger scale.

FIG. 74 is a side view of the coupled coupling and latch.

FIGS. 75 and 76 are cross sectional elevation views of the coupling respectively open and coupled corresponding to FIGS. 73 and 74.

FIG. 77 is a schematic of air connections to the kneeling and wheel lift cylinder of FIGS. 45 and 46.

DETAILED DESCRIPTION OF THE PREFERRED EMBODIMENTS

Referring to the drawings and in particular to FIGS. 1-3, train 12 is shown at two locations a short time interval apart traveling to the right on track 14 imbedded flush in driveway 16 for a transfer run. Train 12 has a depot car 18 with a dock or berth 19 for a transfer vehicle, bus 20. One bus 20 is shown leaving car 18 at the left, FIG. 1, and another accelerated to alignment to drive into the berth at the right. Berth 19 is open along the side and bottom of the car and extends about ¾ into the car for the bus to be driven in and out on driveway 16 as the train moves at a convenient speed for the bus driver. The driveway is paved flush with the top of the rails of track 14 for a distance along a straight stretch of track and has at least one traffic lane along the open berth side but preferably two lanes for the bus that leaves the berth to pass a bus operated to enter the berth as indicated by arrows, FIG. 1.

The train can travel in either direction on track 14 without turning car 18 or bus 20 around. The bus has one side to enter the berth and driver's controls and steering at each end so the bus can work with trains in either direction.

The bus leaving the train can stop first at platform 22 before making a run distributing and picking up passengers for another train. The bus with passengers for the train would stop at the platform 22 to pick up passengers waiting for the train.

After the bus is driven under berth 19 its wheels 24 are lifted above track and driveway 16 and lifted as needed for passengers to enter and leave the bus in the train, FIG. 4. The bus has doors 26 on tapered ends 27 on the side of the bus which enters car 18. Car 18 has an aisle 26 separated along berth 19 by partition 30 and widened at the ends with doors 32 aligning doors 26 to provide wide entrance and exit to the car from the bus especially for wheelchairs.

Referring to FIGS. 6-9, car 18 has a sill 34 displaced from the centerline of the car to the aisle side of the berth to clear the berth area for the bus to be driven in and out on the driveway. Sill 34 has a top branch 35 run across above berth 19 along the inner face of that side and a header 36 at each end of the opening connecting the center sill 34 with top branch 35 and the displaced main bottom sill 34' all lying in substantially one plane standing at a slant to the vertical as seen in cross-sectional view FIG. 8 and perspective FIG. 9. This substantially can eliminate twisting torque resulting from the buffer force which could be 800,000 pounds to be carried along the center sill past the displacement branches.

Referring to FIGS. 8-14, if desired to enclose berth 19 along the open car side, door panels 38 and 39 are hinged together and suspended to swing on hinge rings 40 that rotate between collars 41 on a circular tube sill bypass 35. The bottom of the lower panel 38 is connected by ropes 42 wound on drum 43 driven by gearmotor 44 to lift the bottom of the lower panel up inward, folding on the upper panel, and lifting the panels above berth 19. Rings 40 are connected by ropes 45 to air cylinders 46 to be rotated outward at the bottom to bring the door panels out when lowered to align with the side of the car. Gearmotor 44 is controlled by limit switches to operate only when the berth is empty.

The bottom panel has a lift latch 47 at each end to which ropes 42 are attached to lift to release the door panels first so the ropes can lift the panels. Door 38-39 is stored over berth 19 and would only be needed if berth 19 is empty in extreme weather, long distance, or stored empty outside.

Referring to FIGS. 15-20, transfer vehicle 20 has a rectangular frame 48 supported on four wheels 24 connected to steer in parallel together for all wheel steering for the vehicle to enter and leave its berth 19 parallel to car 18 and be steerable from either end as front for normal Ackerman highway driving. Each wheel 24 is on an axle steering plate 50 pivotally mounted at 51 to the vehicle suspension and driven by an electric motor 52 secured to the steering plate. Plates 50 at each (front) end (both ends are front) are connected by two telescoping tie rod assemblies 53 for Ackerman steering and 54 for all wheel parallel steering. Both can be the same except for length. The rod at each end of each assembly 53 and 54 has its rod bent 90° and round to turn in respectively closer or farther apart holes in opposite steering plates 50 on each end of the vehicle. Each tie rod assembly comprises two rods, one with a sleeve 56 secured in line on one end and the other slip fit in that sleeve to telescope therein, FIGS. 17 and 18, limited by a pin 58 through the sleeve and rod therein to make when pinned a tie rod assembly 53 of length for Ackerman steering or assembly 54 of length for all wheel parallel steering.

A reversing solenoid 60 is secured on each sleeve 53 and 54 to lift its pin 58 to allow telescoping of the assembly's rods. Pins 56 are located to drop connect the assembly only when wheels 24 are aligned straight on vehicle 20. Each pin 58 is a permanent magnet. Each solenoid 60 is connected in a circuit through reverse switch 62 across battery 64 to lift or force down the pin 58 according to the direction of the electric current. The solenoid has a hollow core with soft magnetic top and shell to hold pin 58 in the selected position until reversed by current in the opposite direction. The solenoids at each end of vehicle 20 are oppositely polarized to operate oppositely together so only one pin 58 is engaged at each end of the vehicle.

Referring to FIGS. 15 and 16, similar as in my prior patent application, axle plates 50 at opposite ends of the vehicle are connected at pivots 71 by overlapping links, bars 72, each having a hinge joint 73 to compensate for swing of plates 50 and slip on each other and in sleeve 74 fixed to the vehicle frame. A segmented plunger 75 connects through a hole in sleeve 74 and in bars 72 from each end when wheels 24 are aligned parallel to the vehicle. The plunger has a ball 76 on each side of a keeper slip pin 77 to line up slip fit in the holes. Pin 77 is as long as two bars 72 are thick to fill the hole when aligned (wheels parallel to the vehicle) to tie the two bars 72 (one from each end of the vehicle) together to slide as one in the sleeve to connect the rear and front wheels to turn together for all wheel parallel steering. Plunger 75 can be shifted when the keeper pin 77 aligns holes in sleeve 74 and bars 72 from opposite ends. Then keeper pin 77 can be shifted to connect the sleeve 74 to the bar 72 connected to either end to lock those wheels parallel to the vehicle and insert a ball 76 in the other bar 72 to free that bar to slide in the sleeve 74 for front wheel steering. The ends of plunger 76 are connected by yoke 78 outside of sleeve 74 to be shifted by linkage or controls by the driver to select front steering at either end or all-wheel steering as described in my U.S. Pat. No. 7,779,761 issued Aug. 24, 2010.

Referring to FIGS. 15, 16 and 21-23, a lift bracket 80 pivotally connected at 81 to frame 48 on each side and at each end of vehicle 20 is lifted and lowered by toggle links 82 connecting the end-facing ends of brackets 80 to frame 48. Each bracket 80 has an end cross member tie 86 that is lifted against end cross member 87 on frame 48 with rubber cushion pads 88 between. Toggle links 82 are pivotally connected between frame 48 and lift bracket 80 on each end of bus 20. The links 82 are pinned together on the rod end of a hydraulic cylinder 90 whose head end is pivotally secured to frame 48, one cylinder at each end and side of vehicle 20. When cylinders 90 are extended, links 82 straighten past toggle to lift and hold vehicle 20 lifted. Depot car 18 has a bus support bracket 92 at each end of berth 19 engaged by cross member 86 on frame 48 when brackets 80 are lowered by cylinders 90 to lift vehicle 20 off runway 16 and up to align doors 26 with 32 for transfer of passengers between the bus and train.

Referring to FIGS. 2 and 24-30, an alignment arm 104 on each end of bus 20 is extendable onto berth 19 to establish alignment for transfer. Each arm 104 is a square tubing slip fit in a square tube 105 secured across each end of the bus. An air cylinder 106 in tube 105 is secured head end to a demountable cap 108 on tube 105 and its rod end connected to tube 104 by pin 109 to extend and retract arm 104 from the open end of tube 105. Arm 104 has a finger 110 mounted on vertical pin 112 to be extended into berth 19 from the forward end of the bus according to the direction of travel. Spring 114 relieves finger 110 to swing out endward if the rear wall of berth 19 hits the finger. Spring 114 around pin 112 returns finger 110 to alignment with tube 104. Ledge 116 on tube 104 engages finger 110 when in line to prevent finger 110 bending back in from straight into berth 19 so the bus can apply moderate force against the forward end of berth 19 and be in alignment for transfer. Finger 110 is covered with rubber sheet 119.

A pressure gauge 118 in view of the bus driver is connected to a pressure transducer 120 located on tube 105 to tell the pressure that tube 104 is applying to tube 105 so the driver need not push forward on the train more than a few pounds to maintain alignment.

Finger 110 is flush with tube 105 across each end of the bus for arm 104 to roll against rollers 122 along each end of berth 19 to guide the bus in and out under berth 19.

Referring back to FIGS. 2-4, the bus should be driven to press arm 104 against the front wall of berth 19 all the way while entering and leaving the berth to further prevent misalignment when entering and to have enough forward acceleration to clear the train when leaving.

When arm 104 engages the far side in berth 19 the arm is pushed into tube 105 as the bus fully enters under the car and turns wheels 24 parallel to the bus if the bus driver fails to, preventing the bus from forcing itself against the far side of the car. For this safety feature the head end of a steering control cylinder 124, FIG. 28, is pivotally connected to frame 48 at each end of the bus. Yoke 126, secured on the rod end of cylinder 124, holds roller 128 to roll on top of the tie rod 54 at that end of the bus to push its sleeve 56 to turn wheels 24 only back to parallel with the bus as next explained.

Referring to FIGS. 28-30, arm 104 is extended and retracted by cylinder 106. AIR is connected through 3-position spring centered hand valve 130 shown in spring centered position. Valve 130 is turned to the right clockwise by the driver to extend arm 104. Valve 130 exhausts cylinder 106 in center position. Valve 130 retracts cylinder 106 when turned to the left. AIR is connected at 6 o'clock position to hand valve 130 with outlets at 5 and 7 o'clock positions respectively to the right and left ends of spring centered 3-position spool valve 134 to shift its spool to the left to connect AIR to the head end of cylinder 106 and rod end to exhaust E1. When valve 130 is returned to center, the head end of cylinder 106 is connected through valve 134 to line 136 to accumulator ACC and head end of steering cylinder 124 with check valve 138 in line 136 blocking back flow. The rod end of cylinder 106 remains connected by spool valve 134 to exhaust E1 leaving arm 104 extended but free to be pushed in. Steering cylinder 124 opens exhaust port E when fully extended. Cylinder 124 exhausts air to ACC when pushed during steering. The driver's steering wheel at each end of the bus is connected to gear rack 146 on either tie rod 53 or 54, or on a sleeve 56 as shown, or to a steering plate 50 by the usual linkage. To extend arm 104, valve 130 is held to the right until arm 104 is fully extended. Valve 130 is returned to center position (handle up) by spring, blocking AIR to cylinder 106 and exhausting both ends of cylinder 106 through valve 134 now blocked by valve 130 from AIR and returned to normal center position by its springs. Valve 134 then connects the head ends of cylinders 106 and 124 through line 136 leaving arm 104 extended but free to be pushed in. Arm 104 is retracted by the driver turning handle of valve 130 to the left connecting AIR to 5 o'clock port to the right end of valve 134 shifting it to the left which connects AIR to the rod end of cylinder 106 whose head end is now connected through valve 134 to exhaust port E. Bleed valve 154 at head end of cylinder 124 lets the driver steer to the left as easy as to the right after the time the bus spends on the train.

When arm 104 is pushed in as it hits the far side of berth 19 air in cylinder 106 is forced into cylinder 124 turning wheels 24 straight to the bus if not already straightened by the driver. Cylinder 124 then opens its vent port to exhaust to let cylinder 106 fully return arm 104. The driver can turn valve 130 to the left from center to connect AIR to the rod end of cylinder 106 to fully retract arm 104 forcing air into cylinder 124 to check that wheels 24 are not turned in toward the train.

The bus 20 has operator controls and seat at each end and the usual bus doors that open, in on the near side, FIGS. 24 and 25. The bus has steps 160, FIG. 27, with drop plate cover 162 at the left end far side in FIG. 24 for raising for bus operation from that end. The bus has seats over wheel well covers and raised foot platforms in front of these seats.

VARIATIONS

Similar parts are given the sane reference number with suffix added where modified.

Referring to FIGS. 31-37 for application to mass transit where trains 12A run in opposite directions on double tracks 14 spaced apart for stations 22 and transfer cars 200 between. Station platforms 22 are flanked on each side by a single rail 201 embedded in the transfer runway 16A for grooved wheels 202 on station cars 200 to run on while supported by overhead track 203. Station cars 200 each have two berths 19A in tandem each for carrying a container or carry-over bus 20A. Each train 12A has at least one depot car 18A with four berths, two abreast in tandem, each for a bus 20A. Car 18A has center sill 34A and partitions 30A separating berths 19A. The overhead track 203 carries electrical conductors for the station cars 200.

Only berths 19A on one side of car 18A are used for transfer on a given run. The berths on the opposite side each have a container-bus 20A with end doors open to form a wide open aisle through car 18A reversed to the other side for the return run. If train 12A is not turned around at the end of a run the last station cars serving to the end of a run do not take a container-bus from that train, leaving the train's berths 19A full and the station cars empty. For the return run, station cars 200 take a container-bus out from the opposite side of car 186 at the start of the return trip. The aisle of berths 19A is now on the opposite side of the train without turning cars 18A around.

Container buses 20A have four wheels 24 mounted on typical steering plates 50 as in FIGS. 15-18 and knuckles with mechanism to kneel at each end except the steering plates are only connected by links 54 and 72 to turn all wheels in parallel, see FIG. 37, with no Ackerman steering, simplifying steering. The tie rods 54 are slip connected to the end arms 104 pivotally mounted between plates 50 across each end of the bus. No motors are needed since the bus is moved only by cars 18A and 200 therebetween. An arm 104 is in each tube 105 facing out at each end of the transfer side as in FIG. 37. A steering cylinder 124 as in FIG. 28 is pivotally connected to tie rod 54, now tube 104, and the frame 48 at each end of the bus 20A. AIR is connected through valves 130 and 134 selectively to the head or rod end of a cylinder 104 to extend or retract each arm 104. AIR is connected in series through valve 134, cylinder 104, valve 134, line 136, check valve 138 to the head end of cylinder 124 to return steering to parallel to the train 12A.

Arm 104 hits the car sill when the bus continues to enter further into car 18 and telescopes the arm in as the bus moves further in until arm 104 engages rod 54 to straighten steering to be parallel to the train as the bus fully enters the berth, FIG. 57.

When an extended arm 104 is pushed in by engaging wall 30A on car 18A or tab 207 on car 200, wheels 24 are turned parallel to the bus. Tab 207 is extended along the far side of station car 200 to push in the extended arm 104 on the bus 20A as it reaches alignment under the station car to steer bus 20A parallel to car 200. When bus 20A is in berth 19A or 19B and controlled to "kneel" it sets down on vehicle 18A or 200 respectively and lifts its wheels 24 off runway 16A. Doors 26 are at height to align doors 32 without lifting the bus. The station car 200 stops at platforms 22 to let people off and on the bus at side door 26 before aligning the next train 12A. Station car 200 has two berths 19B that align two berths 19A in car 18A to simultaneously transfer one bus into and one out from car 18A.

Referring to FIGS. 38-44 where the transfer system is applied to a street railway where street 16S has a double track 14 down the middle for two-way operation of low floor articulated tram cars 18B which might be turned on a loop 14L or reversed at either end of the run. Cars 18B each have a center unit having ends supported on swivel trucks TS connected by a strong roof 260 over a berth 19B for bus 20B to drive in and out with four wheel parallel steering described. The bus floor is at the same height as the tram floor so the bus need not be lifted on the tram. The bus wheels can kneel its body, a common feature of buses, here used to lift its wheels 24 to ride smoothly on the tram, which can then extend onto open track with the bus. Bus 20B has end doors 26E which align end doors 32E to berth 19B on the tram. Other street traffic can clear the way for the bus to transfer to and from the tram on sound signal from the tram or bus. The bus has end tubes 105 to kneel on end brackets 92 on the tram to lift its wheels 24 above the pavement. The tram can keep running while buses 20S make local stops and drive into a berth 19B and open doors between the bus and tram for passengers to leave the bus and others to enter for the next local run of the bus. The buses could stay on the tram for as little as two minutes for approximately one mile using both ends of the bus for unloading and reloading the bus for its next local run. The tram driver should not pass a vehicle in the bus lane during a transfer run.

Arm 104 engages vertical rollers 122 along both ends of berth 19B and hits a latch stop tab 206 at the far side of the berth that pushes the arm back into tube 105 and won't let it extend beyond the far side of the tram whichever way the bus or tram is turned. Latch 206 tapers in from the entering side to let arm 106 enter berth 19B but not let bus 20B exit until cylinder 274, pivotally mounted between frame 48B and latch 206, is connected at its head end to pressure to retract latch 206 to let bus 20B pass, FIGS. 43 and 44. The latches on car 18B that face the street traffic lanes are thus released to let the bus leave the train.

Referring to FIGS. 45 and 46, wheels 24 on axle plates 50 are each spring mounted on the rod end of lift cylinder 90 whose head end is pivoted to frame 48B at 81. A link 82 connects frame 48B to the axle on plate 50. Cylinders 90, which serve as shock absorbers, lift wheels 24 off the runway and set bus 20B across end ledges 92 in berth 19B when their head ends are pressured as in FIG. 46.

Referring to FIGS. 47-54, train 12C has two cars 18C with swivel ends 300 which can couple together or couple to a vehicle such as bus 20C between them. Bus 20C has a strong frame 48C with end latch and pocket couplers 302 to tight lock to the same on swivel ends 300 between cars 18C. Swivel ends 300 each include an end passage enclosure 306 with a pocket and latch 302 to couple the same on bus 20C mounted to connect and engage pins 308 in holes to tight lock to ends 300 of car 18C supported to swivel on railway trucks 310 of two cars 18C. Swivel ends 300 are spring centered to align on cars 18C and mounted on a turn table 312 on sill 34 above each truck 310 that supports a swivel end. The bus when supported between cars 18C swivel on trucks 310 on curves. Ends 300 then swivel on the supporting cars 18C and are tight locked to the bus.

Bus 20C has four wheels kneeling ability, end doors and coupling at each end to connect between swivel ends 300 of cars 18C and pin to swivel ends 300. Bus 20C can have ordinary steering and drive to merge between cars 18C running separately along runway 16. The trailing car 18C has operator controls in the swivel end to control coupling and uncoupling, braking, and acceleration. The bus 20C preferably has driver controls at each end including end door and coupling controls. Coupling latches 302 are lifted to open by air cylinder 304, FIG. 53, as in my U.S. Pat. No. 3,037,462, FIG. 20.

To take bus 20C into train 12, trailing car 18C is uncoupled from the forward car 18C along the approach to run 16, brakes to slow to gain space between cars 18C for bus 20C to merge between them when accelerated on run 16 to train speed and steered between and aligned with car 18C ahead. The bus driver accelerates the bus to couple to the forward car 18C. Next the rear car 18C is accelerated to couple to the bus 20C. The bus's wheels 24 are all retracted as in kneeling, and the bus is set on locator pins 308 between cars 18C, and couplers 302 lock bus 20C between cars 18C. Electric and air lines are connected with couplers as in FIGS. 16-20 of my U.S. Pat. No. 3,037,462 and as shown in FIG. 66 herein.

To put bus 13C out from the train, doors between the bus and train are locked closed, bus wheels 24 are put in neutral or accelerated to the train's speed by the bus driver viewing a speedometer through windows in the car ahead, wheels 24 are let down slightly lifting the bus and freeing it to be uncoupled. Brakes on the following cars are applied opening space for the bus to slow and separate from other cars until there is enough space ahead of the bus to turn out. When the bus has cleared from track 14, the following car 18C is accelerated to couple car 18C ahead to put the train back together, or to delay closing the gap to take on another bus 20C.

As a variation of this operation coupled cars 18C can be uncoupled and separate on runway 16 and bus 20C driven and aligned between them and coupled to the forward car 18C. The following car 18C is moved forward and couples the bus. The bus wheels 24 are retracted setting the bus on pins 308 on cars 18C and lifting wheels 24 off runway 16. Other connections are completed and train 12C with bus 20C is ready to go if not already moving.

General Features

Referring to FIGS. 55 and 56, as a general safety feature to prevent hang-ups caused by any turning force on the bus or container entering or leaving a berth, each ledge 92 includes a parallel gear rack 400 and the bus or container has sprockets or pinion gears 402 connected on shaft 404 along the berth entry side of the bus or container to engage in racks 400 when the bus or container starts to enter the berth to keep it parallel with the berth all the way in and out of the berth. The ledges 92 have through holes spaced to form the rack 400 for the pinions 402 to engage in to clear any dirt.

FIG. 55 shows the railway car 18 carrying a container 20C in berth 19. Ledges 92 can be roller ways with rollers 406 to support and roll containers in and out of berth 19.

Arm 104 can have a rubber covered roller 410 mounted on a vertical pin on the end of arm 104 to roll against the forward end of the berth 19.

Referring to FIG. 57, whenever arm 104 is pressured to extend it extends a latch pin from its air cylinder. Pin 414 engages rod 54 to turn steering straight when the arm 104 is pushed nearly in fully. Pin 414 is extended through a hole in arm 104 and cylinder 106 to engage a catch 416 on rod 54 when steering is turned toward the berth and the arm is still under air pressure and pushed in by engaging the back of the berth as it enters to where wheels 24 should be turned straight with car 18.

Pin 414 is secured on a backing piston 418 slip fit in a cross cylinder 420 and retracted into arm 104 by spring 422. When cylinder 106 is pressured piston 418 is pushed against spring 422 carrying pin 414 out to engage the connecting rod 54 when arm 104 is pushed back by engaging the inner wall of berth 19, sill 34 or tab 206B to turn wheels 24 parallel to car 18.

Bus to Train Connection and System

Referring to FIGS. 58, 59, 61 and 65 railway car 18C' has a smaller swivel end 300' mounted to it endward of its rear truck pivot 430 with floor 432 over or under lapping the floor of car 18C'. The car and bus coupling faces are as shown in FIGS. 50 and 51 to couple cars 18C together or to a bus 20C'. The mating end faces of the bus and railway car are tight locked together but cushion mounted to the bus and car frame to take up changes in the grade angles of the track.

If the bus is coupled only to the end of a tram which runs only on paved streets only the front wheels of the bus need to be lifted. The bus has kneeling ability that is used to lift its front wheels. The bus has hi-rail rear wheels 436 for guiding it on track in or out of pavement, but these wheels are not needed if the bus runs only on pavement. If the bus is to be guided by track 14 its rear hi-rail wheels are mounted to be lowered along a straight track straddling curb 438, FIGS. 64 and 67, for guiding the rear bus road wheels so its hi-rail wheels 436 align to engage track 14 where lowered thereto.

Referring to FIGS. 62, 63, and 64, the retractable swivel hi-rail truck 440 has a central bolster yoke 442 pivotally mounted on a stud or bolt 444 depending from the underside of the bus frame above to support the hi-rail wheels 436. Four arms 446 are pivotally connected to bolster 442 two per transverse shaft 447 to each support a wheel 436 to rotate with an axle 448 or on a stub shaft. Each arm 446 is connected by a shock absorber spring load cushioning air cylinder 452, to keep wheels 436 engaged with the track when lowered. Air cylinders 452 secured to bolster 442 extend their rod ends each to an arm 446 to lift wheels from track 14. Cable and spring tensioning means 456 are connected between the front facing end of the truck 440 and the bus frame to bias the truck to align with the bus.

Electrical and air line couplers 464 and 465', shown in FIG. 66 about to meet, are like couplers 254 and 255 of FIG. 19 of my U.S. Pat. No. 3,037,462, issued Jun. 5, 1962. These couplers are duplicated in reverse on opposite sides of meeting ends of both the bus and rail car end coupling faces to couple wherever they meet, car to car, bus to car, or bus to bus. The male coupler cylinders 464 bridge the electric lines between vehicles.

Refer to FIG. 67 for a station plan for buses 20C to serve trains 18C moving in either direction. Track 14 has a runthrough siding 14S paved flush in station pavement 16 with spring switches S set to bypass the siding from either direction to keep trains from both directions out of the siding but let buses 20C run out from the siding to couple a train 18C on track 14 beyond the siding along pavement 16 along which the bus can couple or uncouple from a train 18C.

Bus 20C is uncoupled from a train 18C on this runway 16 before reaching the siding by lowering its front wheels to support the front of the bus on pavement 16. The bus driver or next in sequence limit switch connects air to cylinders 452 (FIGS. 62 and 63) to lift the rear hi-rail wheels 436 so the bus can be driven along pavement 16 over onto the siding and onto roads to make stops to deliver and pickup passengers for the next train that the bus is to couple to by driving to the station siding and putting down its rear hi-rail wheels 436 on track 14S facing in the direction to follow the train as it goes by.

When this train passes the siding this bus is driven out over the siding with front wheels on pavement 16 and rear hi-rail wheels 436 guided on track 14S through switch S to track 14 to follow and couple onto the end car of the train. Then the operator lifts the front wheels of the bus to now rest the front of the bus on pins 308 and lower latches 302 between the bus and car to couple them. The rear of the bus rides on wheels 436 on track 14.

This train does not need to make any intermediate station stops to pick up or let off passengers, mail, or express.

Referring to FIGS. 68-76 for an improved variation, bus 20' has a front face plate 450, FIGS. 68 and 69 secured to the frame of the bus with a preferred coupler 454 at bottom center and electrical and air brake coupler as needed, end doors, and accessories as needed. Rail car 18C' has a rear swivel frame 300' with face plate 460 mounted on pins 461 through supporting links 462 (FIG. 71), secured to the frame of the car 18' and extending plate 460 by springs 463 and a coupling latch receptacle 464 to align coupler 454.

The preferred coupler 454, FIGS. 68-76, combines the support of pins 308 with the catch 302 (FIGS. 50-52).

Referring to FIGS. 72-76 coupler 454 is a round shaft with a conical coupling end 465 extending through a hole in the front plate of the bus. Coupler 454 has a slot 466 in depth to about half its diameter close behind its conical end. The thickness of face plates 450 and 460 behind slot 466 is the front face of an integral collar 468 to limit how far out the coupler can extend. Coupler 454 is supported to slide and rotate in a sleeve 470 secured lengthways to the frame of vehicle 20'. An operating handle or rod 472 is secured to extend radially from coupler 454 to shift it out and in and rotate it on its axis. Sleeve 470 has a cam slot 476 through which rod 472 extends to guide and limit movements of the coupler. A keeper, latch plate 478, pivoted on pin 480 between face plate 460 and plate 482 in receptacle 464 is secured to the swivel frame of car 18' so keeper 478 will drop in slot 466 to couple. When coupler 454 is being inserted the conical end lifts keeper 478 to let the coupler enter until slot 466 aligns with the keeper when collar 468 hits the back of wall 450, FIG. 74. Then rod 472 is lifted (pulled up) to position slot 466, FIG. 76, for keeper 478 to drop into to couple to car 18', FIGS. 74 and 76. To uncouple, rod 472 is pushed down to rotate coupler 454 to lift keeper 478 out of slot 466, FIG. 75, so the coupler can be retracted by rod 472.

Referring to FIG. 77 the typical bus kneeling cylinder is modified to be double acting as in FIGS. 45, 46 and 77, to lift the front wheels of vehicle 20C off the road when coupled to the railway car ahead. A two-way valve 490, controlled by the operator, connects AIR to the head end of cylinder 90 to support the bus on its wheels or turned to connect AIR to the rod end of cylinder 90 to lift the front wheels 24 when the front of the bus is supported on railway car 18.

Having thus described my invention with some useful embodiments I intend to cover by claims all embodiments, variations, applications, and parts which are within the true spirit and scope of this invention.

The invention claimed is:

1. A combination including a bus having a frame having a front and rear, said front having a tight lock coupling, a driveway having a flush railway track therealong, a railway car on said track, said car having a rear swivel end with a coupling receptacle for said tight lock coupling to engage in to couple tightly and support the front of said bus on said swivel end of said railway car, said tight lock coupling comprising a shaft with a transverse slot and conical front mounted to be extendable out from the front of said bus and rotatable to engage in said coupling receptacle, a latch keeper in said coupling receptacle mounted to be lifted by said tight lock coupling upon entering said receptacle and dropped in said slot to couple, means to rotate said tight lock coupling to lift said latch from said slot to uncouple, said receptacle supporting the front end of said bus on said railway car when the front wheels of said bus are lifted.

2. A combination as in claim 1 and hi-rail wheels for supporting the rear end of said bus on the track.

3. A combination as in claim 2, a swivel truck on which said hi-rail wheels are mounted to be extended to support the rear of said bus on said track to carry the rear of the bus around track curves.

4. The combination of a bus and a railway car adapted to be coupled together end to end to run along a railway track together, said bus having an elongated bus frame with a front and rear, front and rear highway wheels mounted to said frame respectively at said front and rear to support said bus, said rail car having a rail car frame with a front and rear end, a swivel end frame mounted to turn on the rear end of said car frame to align for coupling, mechanical tight lock coupling secured on said bus extending from the front of said bus to enter said swivel frame and to be tight-lock coupled thereto, said coupling being connected to be controlled from within said bus to couple to and uncouple from said rail car, and means for lifting said front highway wheels of said bus when so coupled to be towed with said car along a railway track flush in roads.

5. A combination as in claim 4 said railway car having a typical said swivel end frame having an enclosed people passage with coupling receptacle for the bus to couple, said bus having a supporting coupling for coupling into said receptacle to support and secure said bus end on said railway car to travel coupled together as in a train, and end doors in both said bus and said railway car that are opened for passage therebetween.

6. A combination as in claim 4, said bus having a second said coupling at the rear, a second said railway car having a said swivel end frame with a receptacle for said coupling to support the rear end of said bus, and lift means for lifting the rear wheels of the bus off of the roadway to travel as a suspended car in a train.

7. A combination as in claim 4, said bus having hi-rail wheels mounted to be extended down for guiding the rear of the bus on rail while said bus is coupled to the swivel end frame of said railway car.

8. In a combination as in claim 7, said bus having said rear highway wheels nonsteering a swivel hi-rail truck having said hi-rail wheels, said swivel hi-rail truck including a swivel knuckle for mounting central on a vertical swivel axle central between said rear wheels of said bus, two frames pivotally mounted transversely to swing parallel on said swivel knuckle oppositely extending lengthwise of said bus, each holding a pair of said hi-rail wheels to run on railway track and swivel clear of said rear highway wheels of said bus, lift means for lifting and lowering said frames to lift and lower said hi-rail wheels, and tensioning means for biasing said swivel hi-rail truck to be parallel to said bus for engaging said track when lowered thereto, said rear highway wheels remaining parallel to said bus frame.

9. The combination as in claim 4, said coupling being a round rod with tapered front end mounted to be axially rotated and extended and retracted out the front of said bus frame, said rail car swivel end frame having a receptor with hole for said rod to enter and a keeper pivotally mounted to be lifted by said rod being inserted in said hole, a transverse slot in said rod for said keeper to drop into to couple, and mechanism to rotate said rod to lift said keeper to clear out of said slot and retract said coupling.

* * * * *